Figure 1:
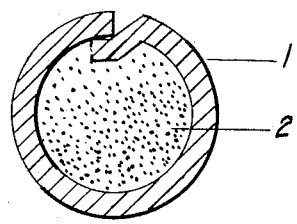

July 5, 1960

P. Y. SJÖMAN 2,944,142

ELECTRIC ARC WELDING ELECTRODES AND
METHODS OF MANUFACTURING THE SAME
Filed March 5, 1958

INVENTOR
*Per Yngve Sjoman*

BY
*Cameron, Kerkam & Sutton*

ATTORNEYS

2,944,142
ELECTRIC ARC WELDING ELECTRODES AND METHODS OF MANUFACTURING THE SAME

Per Yngve Sjöman, Goteborg, Sweden, assignor to Elektriska Svetsnengsaktiebolaget, Goteborg, Sweden, a corporation of Sweden Filed Mar. 5, 1958, Ser. No. 719,358
Claims priority, application Sweden Mar. 7, 1957
3 Claims. (Cl. 219—146)

The present invention relates to arc welding electrodes for the deposition of a weld metal consisting of alloy steel, especially bare electrodes for automatic or semi-automatic welding in a protective gas or by the submerged arc process. More particularly, the invention relates to the type of electrode consisting of a sheath of low carbon iron enclosing a filling or core of metal powder. In this context, the expression "low carbon iron" is intended to designate not only the products usually referred to as "iron," such as Armco ingot iron and wrought iron, but also any mild carbon steel with or without manganese up to about 2% and silicon up to about 1%. It has already been proposed to manufacture such electrodes by forming a steel strip to a U-shaped channel, for instance by passing the same through a pair of shaping rolls, feeding the metal powder into the channel formed and closing the channel by bending down the side edge portions thereof, for instance by means of a set of shaping rolls.

The known electrodes of the type above referred to have a comparatively high electric resistance per unit of length and thence a low current carrying capacity. This is a serious practical disadvantage, as the welding speed, for instance expressed as the weight of deposited metal per minute, of a given electrode will be substantially proportional to the welding current. Attempts have been made to improve the conductivity by heating the electrode to a high temperature sufficient to sinter the powder filling to a coherent body. The improvement of the current carrying capacity obtainable in this manner is, however, quite unsatisfactory. Moreover, difficulties have been encountered in the manufacture of the electrodes, owing to the tendency of the powder during its passage through the feeding mechanism to segregate into fractions having dissimilar compositions, resulting in a varying composition of the powder core along the length of the electrode. To overcome this segregation tendency, the disturbing effects of which are particularly apparent when the quantity of powder per unit of length of the channel is comparatively small, it has been suggested to mix the powder with a binder to a paste which is extruded into the channel. In that case, however, the paste has to be dried before the channel can be closed. This drying operation renders the manufacture considerably more expensive and difficult, particularly in the case of electrodes for automatic welding which are made in long lengths.

The present invention has for its principal purpose to provide an electrode of the type above indicated having a satisfactory current carrying capacity and a uniform composition throughout its length. Another purpose is to provide an improved method of manufacturing an electrode of this type.

According to a principal feature of the invention, the metal powder core of the electrode consists of one single powdered alloy containing at least two non-ferrous metals and has a weight not exceeding the weight of the iron sheath. This feature will result in a low electric resistance of the electrode, owing to the fact that at least half of the electrode weight is formed by a sheath consisting of a low-resistance material. Moreover, the required uniformity of composition is guaranteed by the fact that all of the powder particles have the same composition. The segregation of the powder mass above referred to, which would have been particularly troublesome in the electrodes according to the invention owing to the comparatively small proportion of core employed, therefore will be entirely eliminated.

It will not be necessary to submit the electrode according to the invention to a sintering treatment in order to improve the conductivity of the electrode, the conductivity of the sheath being so high that the improvement of the conductivity of the powder core which may result from a sintering treatment has no practical importance. Neither will any sintering be required with regard to the coherence of the powder, the compacting or compression of the powder obtained in the course of the manufacture of the electrode being sufficient to impart the required coherence to the powder core.

In addition to non-ferrous metals, the powdered alloy may also contain iron. The choice of the iron content will be governed by on one side the desire to obtain the best possible conductivity of the electrode, and on the other side various economical and practical viewpoints which may render the employment of a certain proportion of iron in the alloy necessary or advisable. Preferably the iron content should not exceed 50%. In some cases, however, a larger proportion of iron may be necessary or desirable. For manufacturing reasons, the weight of the powder core should not be less than 10% of the total weight of the core and the sheath. If the total weight of non-ferrous metals to be contained in the core is comparatively small, so that an alloy of said metals with 50% of iron would weigh less than 10% of the whole electrode, it is therefore necessary to raise the iron content of the alloy sufficiently to make the weight of the alloy attain or exceed the lower limit just indicated. As a rule, it will be preferable to employ such proportions that the quantity of powdered alloy will form not less than about 20% of the aggregate weight of the powder and the sheath.

The invention also comprises a method of manufacturing an electric arc welding electrode, comprising the steps of forming a strip of low carbon iron into a channel, depositing uniformly a powdered alloy containing at least two non-ferrous metals in said channel, the weight of said powdered alloy deposited per unit of length of the channel being not less than one-ninth of and not more than equal with the weight of the channel per unit of length, causing the edges of the channel to overlap so as to form a closed sheath, and subjecting said sheath to a diameter reducing treatment comprising at least one cold drawing operation.

The mild steel of the sheath may contain usual proportions of deoxidizing metals and small proportions of other alloying metals. The content of such additions, however, must not be so large as to cause the specific resistance of the steel to exceed 0.30 ohm/m., mm$^2$. Preferably steel of such purity is employed as to have a specific resistance of not more than 0.20 ohm/m., mm$^2$.

The metal powder may be produced in the usual manner by grinding a cast alloy having the desired composition. To reduce the effort required for crushing and grinding the alloy, the same may first be granulated from the molten state. Preferably, however, a powder having the desired degree of fineness is produced directly from the molten alloy by an atomizing process, in which a jet of the molten metal is finely divided and cooled by means of a powerful jet of water converging against the jet of metal.

The diameter of the finished electrode is chosen according to the intended use of the electrode. For instance, electrodes for gas shielded welding may have a diameter between 1.2 and 2.5 mm., and electrodes for submerged welding may have a diameter between 4 and 7 mm. Said figures are stated as examples only and must not be taken to restrict the invention.

Figure 2:
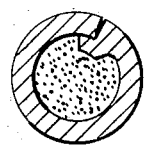
Figure 3:
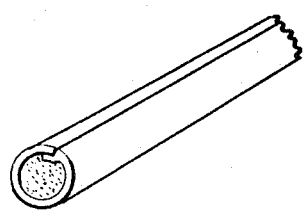
Figure 4:
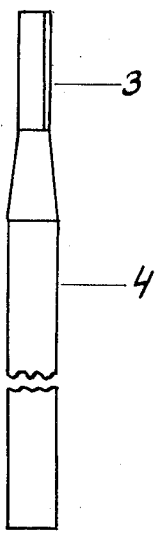

In the accompanying drawing illustrating the invention,

Fig. 1 is a cross-section through an electrode according to the invention during a stage of the manufacture, Fig. 2 is a cross-section (on a larger scale than Fig. 1) through the finished electrode, Fig. 3 is a perspective view of the electrode, and Fig. 4 is a side view of a coated electrode according to the invention.

In Fig. 1, 1 indicates the low-carbon iron sheath, while 2 is the powder core or filling contained therein. The compositions of the sheath and the powder may be as stated in the examples further below. The sheath 1 is formed by an iron strip which is first formed into a channel, for instance by means of a pair of shaping rolls, whereupon a controlled amount of metal powder is deposited uniformly in said channel and the channel is closed, preferably by means of a set of shaping rolls, in such a manner as to cause the edges of the channel to overlap. Fig. 1 shows the electrode at this stage of the manufacture. The shaping rolls or other forming means required for the steps just described, as well as the powder deposition means are well known and need not be further described or shown in this context. The electrode is subjected to a diameter reducing treatment, preferably a succession of cold drafts, from which the electrode emerges with the cross-sectional shape shown in Fig. 2. If desired, the electrode may also be subjected to hot or cold rolling. It is preferred, however, always to employ a cold draft as the finishing step.

While the electrode according to the invention can be employed without any exterior coating, for instance for gas-shielded arc welding or submerged arc welding, it is also possible to provide the electrode with a coating similar to those employed for the usual electrodes for manual welding. In Fig. 4 illustrating this case, 3 is the sheath with its powder core, while 4 is the exterior coating containing the usual slag and flux-forming agents with or without gas-forming and deoxidizing agents.

It is also within the invention to combine the powder-filled sheath according to the invention with a flux-forming coating containing embedded therein a sheath of wire consisting of one or more layers of wire applied to the composite core according to the invention prior to the application of the flux coating thereon, the outer surfaces of said sheath being flush with or emerging slightly beyond the surface of the flux coating, whereby the wire sheath may serve to conduct the welding current from a pair of contact members, between which the electrode is fed forward, to the tubular sheath of the composite core.

In the following particular examples of electrodes according to the invention, the material employed for the sheath is rimmed steel containing 0.07% carbon and 0.4% manganese, the specific resistance of this material being 0.16 ohm/m., mm.²

Example 1

The sheath constitutes two thirds of the total weight of the electrode. The powder core, which forms one third of the total weight of the electrode, consists of a chromium-nickel alloy having the following composition:

| | Percent |
|---|---|
| C | max. 0.1 |
| Mn | 1.6 |
| Si | 3.6 |
| Cr | 60.0 |
| Ni | 27.0 |

Remainder iron.

The weld metal deposited by the electrode consists of an austenitic chromium-nickel steel containing about 19% chromium and 9% nickel.

Example 2

The sheath forms three fourths of the total weight of the electrode. The powder core, which forms one fourth of the total weight of the electrode, consists of a high silicon ferromanganese having the following composition:

| | Percent |
|---|---|
| C | 5 |
| Si | 7 |
| Mn | 63 |

Remainder iron.

The electrode yields a weld metal consisting of austenitic manganese steel.

Example 3

The sheath forms three fourths of the total weight of the electrode. The powder core, which forms one fourth of the total weight of the electrode, consists of the following alloys:

| | Percent |
|---|---|
| C | 1.3 |
| Si | 7.2 |
| Mn | 5.2 |
| Cr | 3.8 |
| W | 33.6 |
| Nb | 6.4 |
| Co | 8.0 |

Remainder iron.

The weld metal deposited with this electrode consists of a chromium-tungsten-cobalt steel suitable for the hardfacing of hot working tools, such as hot shears and forging tools.

Example 4

The sheath constitutes four fifths of the total weight of the electrode. The powder core, which forms one fifth of the total weight of the electrode, consists of the following alloys:

| | Percent |
|---|---|
| C | 3.2 |
| Si | 30.0 |
| Mn | 1.4 |
| Cr | 12.0 |

Remainder iron.

The weld metal deposited with this electrode is a silicon-chromium steel having a high hardness and wear resistance and good resistance to high temperature oxidation.

I claim:

1. An electrode for electric arc welding comprising a sheath of low carbon iron and a metal powder core contained therein consisting of one single powdered alloy containing at least two non-ferrous metals, the weight of said metal powder core being not less than 10% and not more than 50% of the combined weight of the sheath and the metal powder core.

2. An electrode for electric arc welding comprising a sheath of low carbon iron and a metal powder core contained therein consisting of one single powdered alloy containing at least two non-ferrous metals alloyed with not more than 50% of iron, the weight of said metal powder core being not less than 10% and not more than 50% of the combined weight of the sheath and the metal powder core.

3. An electrode as claimed in claim 1 in which the sheath consists of iron of such a degree of purity that the specific electric resistance thereof does not exceed 0.30 ohm/m., mm.².

References Cited in the file of this patent

UNITED STATES PATENTS

| | | |
|---|---|---|
| 1,387,157 | Jones | Aug. 9, 1921 |
| 1,531,828 | Armor | Mar. 31, 1925 |
| 1,629,748 | Stoody | May 24, 1927 |
| 1,650,905 | Mills | Nov. 29, 1927 |
| 1,893,160 | Clarke | Jan. 3, 1933 |
| 2,350,387 | Cito | June 6, 1944 |
| 2,408,620 | Friedlander | Oct. 1, 1946 |

FOREIGN PATENTS

| | | |
|---|---|---|
| 513,045 | Great Britain | Dec. 20, 1937 |